United States Patent [19]

Kantor

[11] 4,421,347
[45] Dec. 20, 1983

[54] PIPE COUPLING

[75] Inventor: Itzhak Kantor, Menashe, Israel

[73] Assignee: Plasson Maagan Michael Industries Ltd., Menashe, Israel

[21] Appl. No.: 323,532

[22] Filed: Nov. 20, 1981

[30] Foreign Application Priority Data

Nov. 27, 1980 [IL] Israel .................................. 61576

[51] Int. Cl.³ .................. F16L 17/00; F16L 25/00; F16L 21/00
[52] U.S. Cl. .................................... 285/369; 285/373; 285/383; 285/417; 285/12
[58] Field of Search ............... 285/369, 373, 383, 351, 285/417, 419, 12

[56] References Cited

U.S. PATENT DOCUMENTS

| | | | |
|---|---|---|---|
| 2,005,056 | 6/1935 | Stephens | 285/383 |
| 2,020,554 | 11/1935 | Johnson | 285/383 |
| 2,225,208 | 12/1940 | Crickmer | 285/373 X |
| 3,423,111 | 1/1969 | Elsner | 285/373 X |
| 4,045,060 | 8/1977 | Daigle | 285/373 X |

Primary Examiner—Richard J. Scanlan, Jr.
Attorney, Agent, or Firm—Benjamin J. Barish

[57] ABSTRACT

In a pipe coupling including a housing having a bore for receiving the end of a pipe, and clamping means for clamping the pipe to the housing, the clamping means is formed on its inner face with a first circumferentially-extending recess for receiving a first clamping ring, and with a second circumferentially-extending recess axially spaced from said first recess for receiving a second clamping ring of a different hardness than the first clamping ring, to thereby enable the coupling to be used for coupling pipes of different hardnesses by selecting the appropriate clamping ring and inserting it into its respective recess.

9 Claims, 6 Drawing Figures

PIPE COUPLING

BACKGROUND OF THE INVENTION

The present invention relates to pipe couplings, particularly to couplings for plastic pipes and/or metal pipes.

A large number of different types of pipe couplings are now in use. Generally speaking, the pipe to be coupled, particularly its hardness, determines the type of coupling to be used since couplings designed for pipes of softer and flexible material would normally not be suitable for pipes of harder and more rigid material.

BRIEF SUMMARY OF THE INVENTION

A broad object of the present invention is to provide a pipe coupling which may be used with either the harder or the softer type pipes. Another object is to provide a coupling which can be produced in volume and at low cost.

According to a broad aspect of the present invention, there is provided a pipe coupling including a housing having a bore for receiving the end of a pipe, and clamping means for clamping the pipe to the housing, characterized in that said clamping means is formed on its inner face with a first circumferentially-extending recess of substantially inverted-L-section to receive a first clamping ring of corresponding section, and with a second circumferentially-extending recess axially spaced from said first recess and of substantially T-section to receive a second clamping ring of corresponding section and of a lower hardness than the first clamping ring, to thereby enable the coupling to be used for coupling pipes of different hardnesses by selecting the appropriate clamping ring and inserting it into its respective recess.

The invention thus enables pipe couplings to be constructed for use with pipes of different hardnesses, by selecting the appropriate clamping ring and inserting it in its respective recess; for example, the coupling is equally suitable for use with hard aluminum or PVC pipes, or with softer polyethylene pipes. The invention also enables pipe couplings to be constructed in volume and at relatively low cost. Thus, the clamping jaws and the housing may both be injection-molded of relatively inexpensive softer materials, such as polypropylene, since the clamping action is effected by the clamping rings which may be made of the more expensive harder material, such as stainless steel for the metal clamping ring and hard acetyl resin for the plastic clamping ring.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
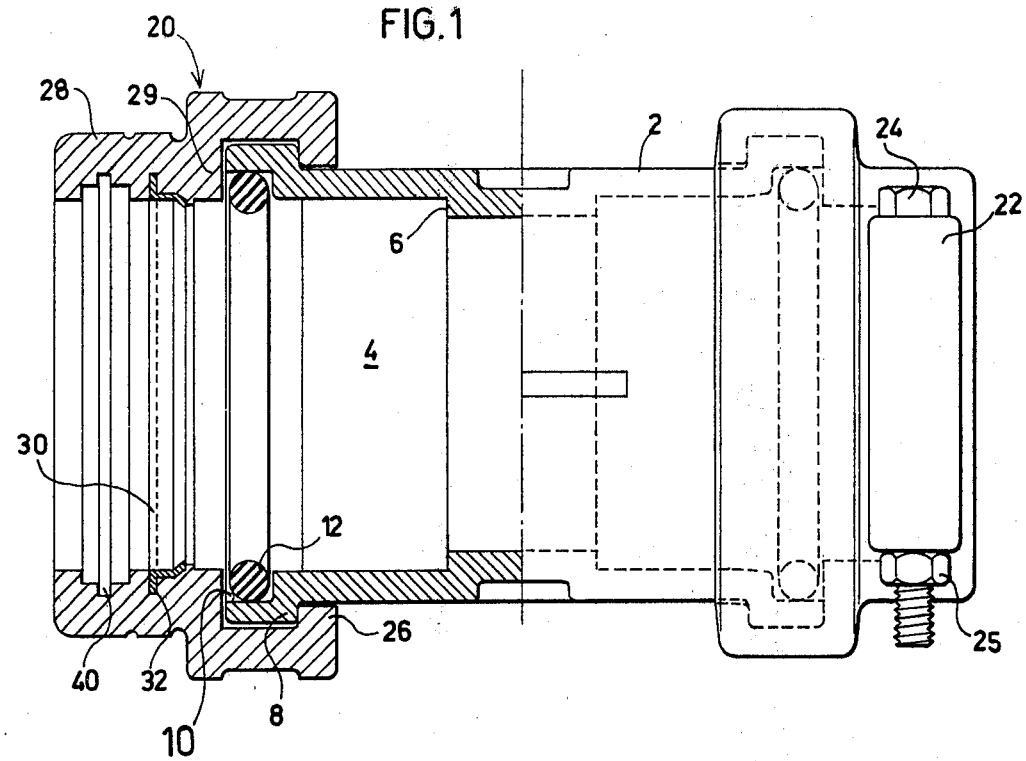
FIGS. 1, 2 and 3 are side elevational, top plan, and end elevational views, respectively, illustrating one form of pipe coupling constructed in accordance with the invention, FIGS. 1 and 3 being partly in section.
Figure 2:
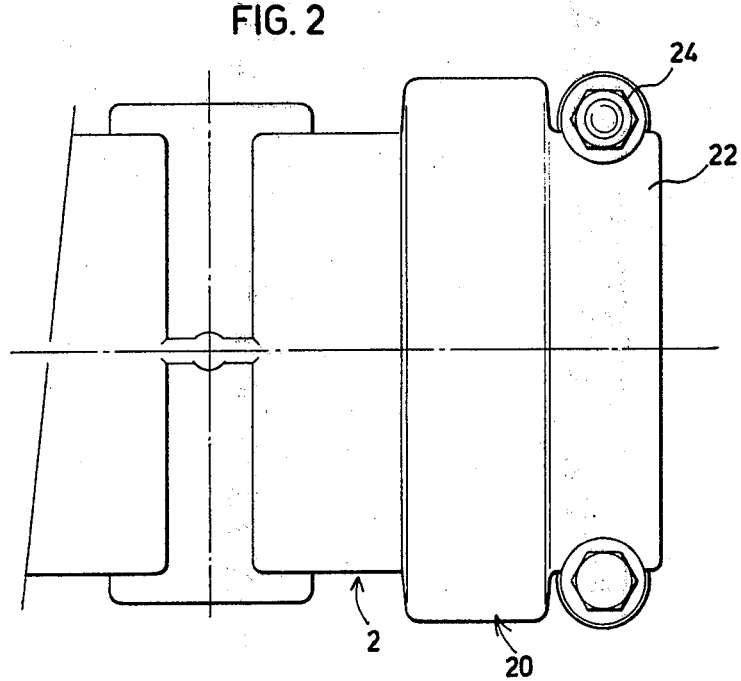

Briefly, the pipe coupling illustrated in the drawings comprises a housing, generally designated 2, formed with a bore 4 for receiving a pipe (not shown) through each end, each pipe limiting against an internal annular shoulder 6 of the housing. The two outer ends of the housing 2 are both enlarged to define an outwardly-extending annular flange 8 on the outer face of each end, and an annular recess 10 at the inner face of each end. Flanges 8 are adapted to receive clamping means for clamping the pipes to the housing, as will be described more particularly below, and recess 10 is adapted to receive an annular sealing ring 12 for effecting a seal between the end of the pipe and the housing.

The clamping rings for clamping the pipe at each end of the housing 2 comprise a pair of clamping jaws, each generally designated 20. The two jaws are formed on their outer faces with embossments 22 which receive fasteners, namely bolts 24 and nuts 25, for securing them to the respective end of the housing 2. The inner end of each of the semi-circular clamping jaws 20 is formed with a depending flange 26 which engages the outer flange 8 at the respective end of the housing 2 when the two jaws are thus clamped to the housing. The outer end 28 of each clamping jaw 20 is constructed, as to be described below, for securely holding the pipe when the two jaws are secured together and to the housing 2. In addition, each clamping jaw 20 is formed at its inner end with an inwardly-extending shoulder 29 for engagement with the sealing ring 12 of the housing when each pair of clamping jaws 20 are clamped to their respective end of the housing.

Figure 4:
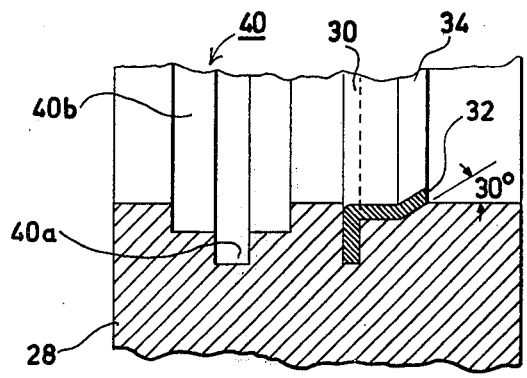
FIG. 4 is an enlarged fragmentary view illustrating the construction of the inner face of the clamping jaws in the pipe coupling of FIGS. 1–3.
Figures 4A, 4B:
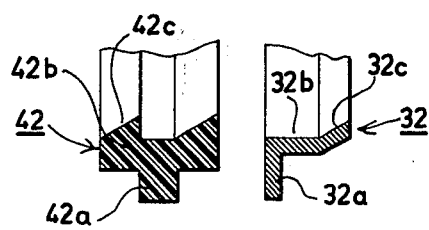
FIGS. 4a and 4b are sectional views illustrating the sectional configuration of the two clamping rings selectively insertable into their respective recesses in the clamping jaws of the pipe coupling of FIGS. 1–3.

More particularly, the outer end 28 of each clamping jaw 20 is formed with two recesses for selectively receiving clamping rings of different hardnesses, to enable the coupling to be used for clamping pipes of different hardnesses by selecting the appropriate clamping ring. Thus, as shown in FIG. 1, and particularly in the enlarged fragmentary view of FIGS. 4, 4a and 4b, each clamping jaw 20 is formed with an inner recess 30 for receiving a metal (e.g., stainless steel) clamping ring segment 32 (FIG. 4a), and with an outer recess 40 for receiving a plastic (e.g., hard acetyl resin) clamping ring segment 42 (FIG. 4b). Since only one clamping ring would be used in a particular application, FIG. 1 illustrates, for purposes of example, the provision of only clamping ring segment 32 within its recess 30.

Each recess 30, and the metal clamping ring segment 32 received within it, are both of substantially inverted-L-section (FIG. 4a), the ring segment including a first leg 32a extending in the radial direction when received within recess 30, and a second leg 32b extending inwardly in the axial direction along the inner face of the clamping jaw 20. The free end of leg 32b is bent radially inwardly and is formed with a sharpened tip, as shown at 32c, to define a tooth for biting into the pipe to be clamped by the respective pair of clamping jaws. In addition, the inner face of each clamping jaw 20 is formed with a circumferentially-extending rib 34, as shown particularly in FIG. 4, axially spaced from recess 30, such as to underlie and support tooth 32c of clamping ring segment 32.

The second clamping ring segments 42, like their respective recesses 40 in which the segments are received, are of substantially T-section, each including a first leg 42a extending in the radial direction when received within its respective recess 40, and a second leg 42b extending axially on both sides of the first leg 42a. Leg 42b is formed with a tooth 42c at each of its opposite ends for engagement with the pipe to be coupled by the pair of clamping jaws at the respective end of the housing. Recess 40, configured to receive the clamping ring segments 42, is similarly configured, namely including a deep recess section 40a for receiving leg 42a of the clamping ring segments, and a shallower section 40b on each side of section 40a, for receiving the leg 42b of the clamping ring segment formed with the pipe-engageable teeth 42c.

Figure 3:
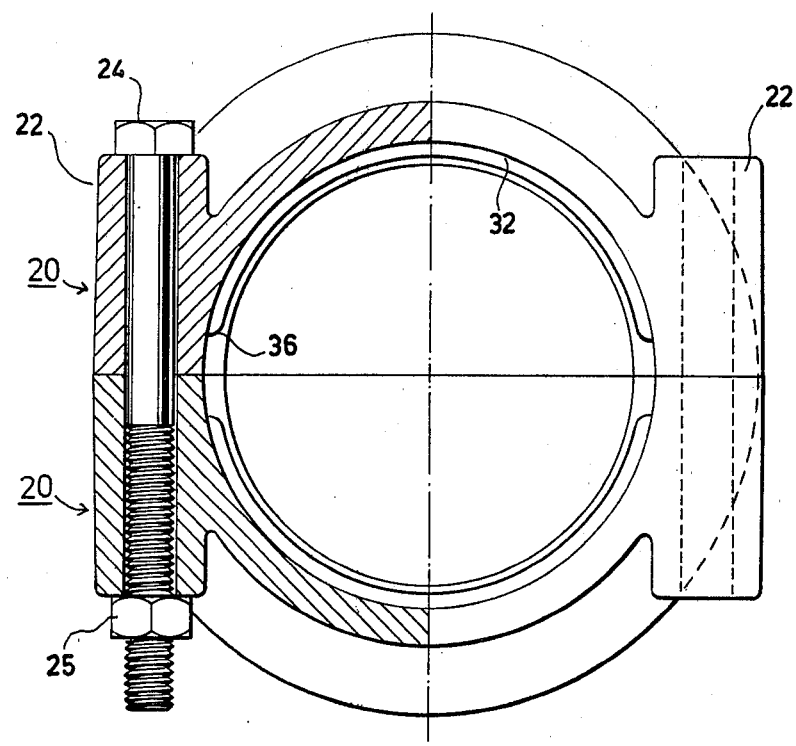

It will thus be seen that when two clamping jaws 20 are clamped together via bolts 24 and nuts 25 to their respective end of the housing 2, the recesses 30 and 40 define complete annular recesses for receiving the selected clamping ring segments 32 or 42. Each of the two jaws is provided with the selected segment so that the two segments of the two jaws together define a substantially annular clamping ring extending along the inner face of the two jaws. Actually, each recess 30 or 40 terminates short of the opposite end of the respective jaw 20, so that each recess defines an arc slightly less than 180°. Similarly, each clamping ring segment 32 or 42 also defines an arc slightly less than 180°. This is best seen in FIG. 3, wherein it will be seen that the opposite ends of the two metal clamping ring segments 32 terminate short of their respective ends of the clamping jaw 20. In addition, the opposite ends of the clamping ring segments 32 are rounded, as shown at 36 in FIG. 3. Both of these features preclude the possibility that the ends of the clamping ring segments will first engage the pipe to be coupled, before the main portion of the clamping ring segments, which may interfere with a secure clamping action by the main portions of the clamping ring segments 32.

A similar arrangement would be provided with respect to recesses 40 and the plastic clamping ring segments 42 (FIG. 4b), for the same reasons.

The pipe coupling illustrated in the drawings would be used in the following manner.

The type of pipe to be coupled would first be determined. Thus, if it is a hard and rigid pipe, the coupling is to be equipped with the metal clamping ring segments 32 which are inserted within their respective recesses 30 of clamping jaws 20; and if a relatively softer or more flexible pipe is to be coupled, the plastic clamping ring segments 42 are to be used and are inserted within their respective recesses 40. It is to be noted that recesses 30 for receiving the metal clamping ring segments 32 are located inwardly of the respective clamping jaw (i.e., closer to the location of shoulder 29 and the sealing ring 12), since the metal clamping rings 32 deform the pipe to be coupled less than the plastic clamping rings 42, and therefore avoiding the metal clamping rings at this location is less likely to disturb the seal provided by the sealing ring 12.

After the appropriate clamping ring segments (32 or 42) are inserted within their respective recesses (30 or 40) in both clamping jaws 20 at the respective end of the housing 2, the two clamping jaws are secured to the housing by engaging flanges 26 of the clamping jaws with the inner side of housing flange 8, aligning the embossments 22 at opposite sides of the respective pair of clamping jaws 20, and securing them together by means of bolts 24 passed through the aligned embossments 22, and nuts 25 applied to the opposite ends of the bolts.

The above procedure is used for applying one pipe to one end of housing 2. The other pipe applied to the opposite end would be secured in the same manner by means of the two clamping jaws 20 clamped to the housing at the opposite end of the housing.

It will thus be seen that the illustrated pipe coupling may be used for clamping pipes of different hardnesses, by merely selecting the appropriate clamping ring segments (32 or 42) and inserting them in their respective recesses (30 or 40) of the clamping jaws 20. It will also be seen that the housing 2, and also the clamping jaws 20, may all be made of relatively inexpensive softer materials, such as polypropylene, since the clamping action is effected by the clamping rings (32 or 42), which clamping rings alone need be made of the harder, more expensive material.

While the invention has been described with respect to one preferred application, namely, in an in-line pipe-to-pipe coupling, it will be appreciated that it could be used in many other applications, for example, Y-type or T-type pipe couplings, or the like.

Many other variations, modifications and applications of the invention will be apparent.

What is claimed is:

1. A pipe coupling including a housing having a bore for receiving the end of a pipe, and clamping means for clamping the pipe to the housing, characterized in that said clamping means is formed on its inner face with a first circumferentially-extending recess of substantially inverted-L-section to receive a first clamping ring of corresponding section, and with a second circumferentially-extending recess axially spaced from said first recess and of substantially T-section to receive a second clamping ring of corresponding section and of a lower hardness than the first clamping ring, to thereby enable the coupling to be used for coupling pipes of different hardnesses by selecting the appropriate clamping ring and inserting it into its respective recess.

2. The pipe coupling according to claim 1, wherein said first recess is configured to receive a first clamping ring of metal having a first leg to extend in the radial direction when received within the recess and a second leg to extend in the axial direction along the inner face of the clamping means and having a free end bent radially inwardly to define a tooth for biting into the pipe to be coupled thereby, the inner face of the clamping means being formed with a circumferentially-extending rib axially spaced from said first recess and located to underlie and support said tooth of the first clamping ring when received within said first recess.

3. The pipe coupling according to claim 1, wherein said second recess is configured to receive a second clamping ring of plastic having a first leg to extend in the radial direction when received within the recess, and a second leg to extend axially on both sides of the first leg along the inner face of the clamping means, which second leg is formed with a tooth at each of its opposite ends to extend inwardly in order to bite into the pipe to be coupled thereby.

4. The pipe coupling according to claim 1, wherein the housing includes a sealing ring inwardly of the two recesses, said first recess for receiving said first clamping ring being the one closer to the sealing ring.

5. The pipe coupling according to claim 1, wherein said clamping means comprises a pair of clamping jaws each of semi-circular section formed on its inner face with said recesses for selectively receiving the clamping rings, and on its outer face with embossments for receiving fasteners for securing the two clamping jaws to the housing.

6. The pipe coupling according to claim 5, wherein said recesses for selectively receiving the clamping rings terminate short of the opposite ends of the semicircular clamping jaws such that each recess is adapted to receive a clamping ring segment defining an arc slightly less than 180°.

7. The pipe coupling according to claim 5, wherein the inner ends of said clamping jaws are formed with inwardly-extending flanges for engagement with outwardly-extending flanges on the outer end of the housing when the clamping jaws are secured to the housing.

8. The pipe coupling according to claim 7, wherein the outer end of the housing formed with said outwardly-extending flange defines an annular recess in its inner face and receives an annular sealing ring therein, said clamping jaws being formed on their inner faces with an inwardly-extending shoulder which shoulders engage said sealing ring for retaining same in place.

9. The pipe coupling according to claim 1, further including at least one of said clamping rings received in its respective recess.

* * * * *